United States Patent [19]

Ullrich

[11] 3,923,659
[45] Dec. 2, 1975

[54] APPARATUS FOR PROCESSING FLUSHING LIQUOR FROM A GAS MAIN OF COKE OVENS

[75] Inventor: Hansjurgen Ullrich, Schwalbach, Germany

[73] Assignee: Dr. C. Otto & Comp. G.m.b.H., Bochum, Germany

[22] Filed: July 29, 1974

[21] Appl. No.: 492,500

[30] Foreign Application Priority Data
Aug. 2, 1973  Germany............................ 2339080

[52] U.S. Cl. ................ 210/179; 210/187; 210/260; 210/298; 210/521; 210/526
[51] Int. Cl.² ......................................... B01D 35/18
[58] Field of Search ............ 210/175, 178, 179, 260, 210/298, 299, 305, 400, 407, 513, 521, 523, 526, 532, 187

[56] References Cited
UNITED STATES PATENTS

| | | | |
|---|---|---|---|
| 1,190,863 | 7/1916 | Corne et al. ..................... | 210/521 X |
| 2,494,534 | 1/1950 | Armstrong et al. .............. | 210/298 X |
| 2,747,680 | 5/1956 | Kilpatrick ....................... | 210/513 X |
| 2,999,597 | 9/1961 | Hams .............................. | 210/521 X |
| 3,455,457 | 7/1969 | Popelar........................... | 210/298 X |
| 3,456,798 | 7/1969 | Urdanoff.......................... | 210/298 X |
| 3,666,111 | 5/1972 | Plelkenrood et al................ | 210/521 |
| 3,666,112 | 5/1972 | Plelkenrood et al................ | 210/521 |
| 3,676,307 | 7/1972 | Black .............................. | 210/175 |
| 3,795,316 | 3/1974 | Wood .............................. | 210/298 |

Primary Examiner—Theodore A. Granger
Attorney, Agent, or Firm—Brown, Murray, Flick & Peckham

[57] ABSTRACT

Flushing liquor from a gas main of a coke oven undergoes separation in a tank to obtain water which is essentially free of tar and solids and to obtain tar which is essentially free from water and solids. A receiving chamber in the tank passes the flushing liquor to the bottom of a first group of inclined settlement surfaces above a tar and water phase boundary in the tank. The settlement surfaces are parallel to each other and corrugated to define troughs extending in the liquid flow direction. The water at the top of the settlement surfaces passes over a weir and the tar phase is received at the bottom of a second group of inclined settlement surfaces in the tank, the entrance way to which lies below the tar and water phase boundary. The inclined settlement surfaces of the second group are parallel to each other and corrugated to define troughs that extend in an upward liquid flow direction. An adjustable weir is downstream of a submerged wall to permit only the flow of tar from the area above the second group of settlement surfaces. A second adjustable weir controls the flow of an overlying layer of water on the tar into side chambers formed in the tank. Heating means are located in the tar phase below the entrance way to the second group of settlement surfaces. A scraper conveyor underlies both groups of settlement surfaces for discharging solid particles settling onto it in the tank.

9 Claims, 4 Drawing Figures

APPARATUS FOR PROCESSING FLUSHING LIQUOR FROM A GAS MAIN OF COKE OVENS

BACKGROUND OF THE INVENTION

The present invention relates to an apparatus for processing flushing liquor from a gas main of a coke oven to provide a watery liquid essentially free of tar and solid particles for continued use to flush such gas mains and to provide tar which is essentially free of solid particles and water. More particularly, the present invention relates to an improved form of such apparatus which is compact and efficient.

In modern-day coke oven operations, it is a usual procedure to withdraw the gas liberated during the coking operation into a main having a relatively large cross section and extending along the length of the coke oven battery. The gas in the main is treated with water in such amounts to considerably reduce the gas temperature and to cause precipitation of various ingredients present in the gas, particularly tar and solids. In this way, the flushing liquid flows along the bottom of the gas main and carries along the precipitated ingredients. The tar and solids present in the flushing liquid must be removed before the liquid is reintroduced into the gas main. In the separation process, the tar yield is required to have a very low water content.

The apparatus conventionally employed for the processing of flushing or washing liquid are very bulky and the separation process takes a relatively long time. Moreover, very often the water content of the tar is not sufficiently reduced below a required value.

SUMMARY OF THE INVENTION

It is an object of the present invention to provide an apparatus for processing gas main flushing liquor to obtain in addition to a watery liquid suitable for return use in the gas main, a low water content tar and a separation of solids contained in the flushing liquor.

It is a further object of the present invention to process gas main flushing liquor by employing a construction and arrangement of parts for an apparatus that occupies far less floor space than known apparatus for a similar purpose and further that the apparatus of the present invention is adapted to be constructed from materials at lower costs to provide a very efficient separation of the ingredients required to be removed from water and from tar.

In accordance with the present invention there is provided an apparatus for processing flushing liquor from a gas main of a coke oven to obtain a watery liquid which is substantially free from tar and solids and to obtain tar which is substantially free from water and solids, the apparatus comprising a tank receiving the flushing liquor for forming a tar and water phase boundary therein, means forming a first group of inclined settlement surfaces in the tank and having a bottom entrance way for the liquid to be treated thereby lying above the tar and water phase boundary, first adjustable overflow means in the tank above the first group of inclined settlement surfaces for controlling the flow of liquid therefrom, means forming a second group of inclined settlement surfaces in the tank and having a bottom entrance way for liquid to be treated thereby lying below the tar and water phase boundary in the tank, and second adjustable overflow means in the tank above the second group of inclined settlement surfaces for controlling the flow of liquid therefrom.

The present invention utilizes a principle known from other branches of chemical engineering, for the separation of substances through the agency of a large number of inclined settlement surfaces disposed at a reduced spacing from one another. This principle is utilized both to separate water from the ingredients vehicled thereby and also to separate tar from the water. To accommodate the special requirements for the tar and solid separations, two separate groups of inclined settlement surfaces are provided in a common tank wherein solids are separated from the water and from the tar. The settlement surfaces of each group have bottom entries for liquid to be treated. The entrance ways to the two groups are at such heights that the entry to the water receiving group is disposed above a tar-water phase boundary in the tank and the entry to the tar receiving group is disposed below this boundary. Above both groups of inclined settlement surfaces are adjustable overflows which are adjusted to form the tar phase boundary at the desired elevation in the tank. Preferably, the two groups of inclined settlement surfaces are disposed in a consecutive relationship and separated from one another by an inclined wall in the tank. The tank occupies a rectangular floor space that is smaller than usual. A scraper conveyor runs above the tank bottom and delivers the solids which drop out of the liquids.

The groups of inclined settlement surfaces are formed by partitions and disposed at a reduced spacing from one another whereby the liquids travel only a short vertical distance between consecutive partitions so that separation proceeds rapidly according to the specific gravity whereby a liquid will either drop or rise in the groups of inclined settlement surfaces. Consequently, unlike the relatively large space required in the known apparatus for similar purposes, all that is required in the novel apparatus according to the present invention are chambers or compartments which have a relatively reduced height. The length of such chambers or compartments for a given separation process need only be a small portion of the length of conventional tanks. The total volume of the separators is, therefore, only a small portion of the dimension of conventional tar separators and the material costs for given installations are greatly reduced.

The present invention further provides a number of constructional features which considerably increases the effectiveness of the apparatus utilizing groups of inclined settlement surfaces.

The walls forming each of the groups of settlement surfaces have trough-like convexities which extend in the flow direction and serve to collect the substances to be separated. This will alleviate or reduce remixing of the substances being separated with the inflowing liquid mixture. In other words, it will reduce or alleviate mixing of the tar separated out of the liquid with the inflowing tarry water from the first group of inclined settlement surfaces and remixing of the water separated from the tar with the tar in the second group of inclined settlement surfaces. In the first group of inclined settlement surfaces, it is important that the convex shape thereof is provided on the lower ends of the partitions since the tar descends along such troughs or convexities. It is essential that the convex portion of the second group of inclined settlement surfaces is located at the top portion thereof since the water which has been separated from the tar rises in the troughs formed by the convexities.

A simple way of providing the convexities for the partition walls making up the first and second groups can take the form of curved plates whose curves form troughs extending parallel to the flow direction of the liquids passing through the groups of settlement surfaces.

Vertical deflectors extend into the spaces where there is a concentration of separated substances to preclude remixing of the separated ingredients collected in the troughs with other liquids. When the convexities of the walls in each group of settlement surfaces form consecutive parallel rows, such deflectors are located at the outlet of the groups where the separated substances issue from each group. Thus, the deflectors for the first group of settlement surfaces are disposed at the bottom entry of the settlement surfaces and extend below the tar-water phase boundary whereas the deflectors for the second group of settlement surfaces are disposed at the top thereof and extend into a layer of water which forms above the tar.

To accelerate separation of water from the tar, indirect heating is provided below the group of settlement surfaces used to separate water from the tar. A thermally insulated inclined wall extends between the two groups of settlement surfaces. Along the long and short sides of the tank, side chambers are provided to receive clean water flowing from the overflows above the first and second groups of inclined settlement surfaces. This water is still relatively warm and will maintain a relatively high temperature in the tank to insure that the temperature is always sufficiently high enough. An outlet from the side chambers is provided to remove the liquid therefrom. A chamber for collecting the low water content tar is provided in the tank in a similar way so that the tar remains at an appropriately high temperature.

These features and advantages of the present invention as well as others will be more fully understood when the following description is read in light of the accompanying drawings, in which.

Figure 1:
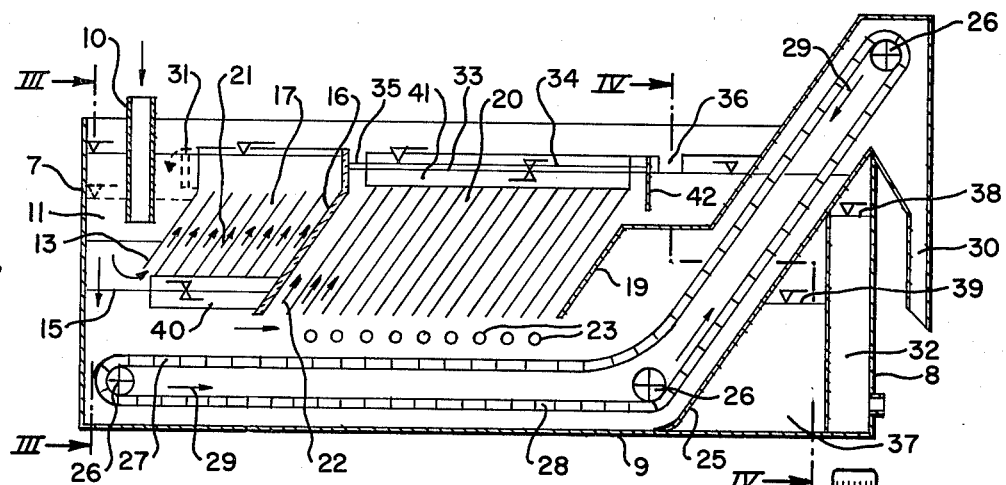
FIG. 1 is an elevational view, in section, through the apparatus according to the present invention.
Figure 2:
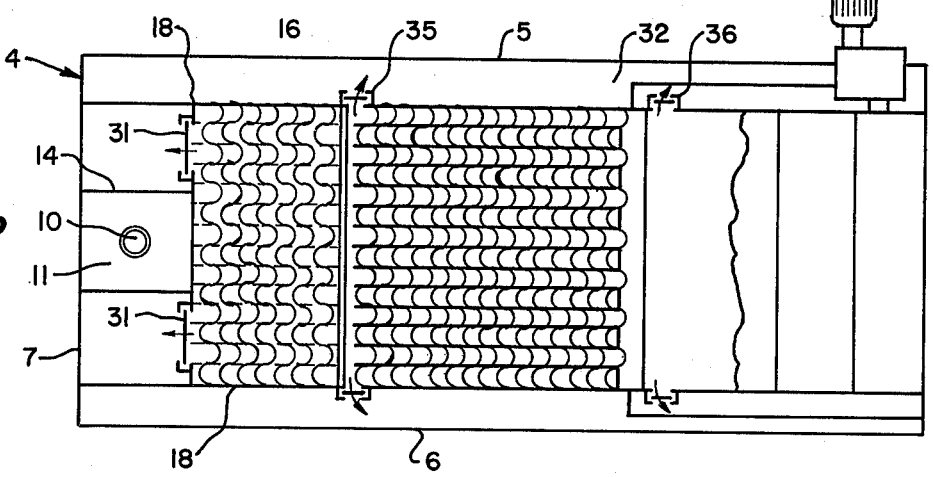
FIG. 2 is a plan view of the apparatus shown in FIG. 1.
Figure 3:
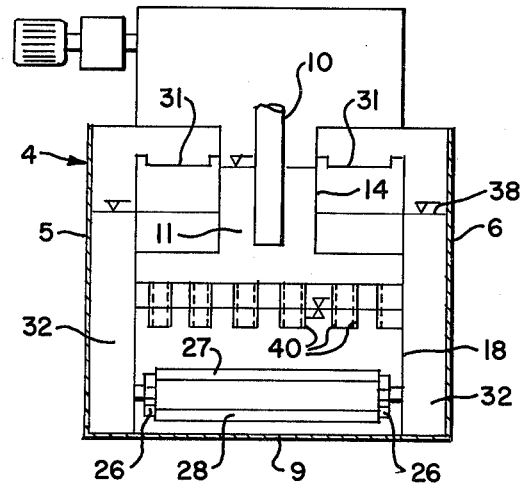
FIG. 3 is a sectional view taken along line III—III of FIG. 1.
Figure 4:
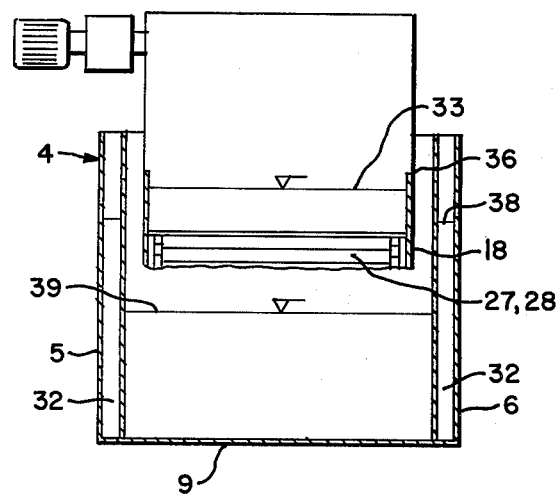
FIG. 4 is a sectional view taken along line IV—IV of FIG. 1.

FIGS. 1-4 illustrate a generally rectangularly-shaped tank 4 essentially made up of spaced-apart side walls 5 and 6 that are secured to end walls 7 and 8 and a bottom wall 9. A pipe 10 extends into an inflow basin 11 which is bounded within the tank 4 by the outer end wall 7, an internally located inclined wall 13 and side walls 14. The basin 11 is open at the bottom. A tar-water phase boundary is denoted at 15 in FIGS. 1 and 3 and this phase boundary is formed as hereinafter more fully described at a desired elevation above the floor 9 of the tank. A first group of inclined settlement surfaces 17 is bounded within the inclined wall 13 and an inclined wall 16 together with lateral closure walls 18. The settlement surfaces 18 have a bottom entry spaced above the tar-water phase boundary 15. A second group of settlement surfaces 20 is disposed between the wall 16 and an inclined wall 19 and bounded by extensions of the lateral closure walls 18. The second group of settlement surfaces 20 has a bottom entry located below the tar-water phase boundary 15.

The first group of settlement surfaces 17 is utilized more particularly to separate tar from the water rising in the direction indicated by arrow 21. The second group of settlement surfaces 20 is utilized more particularly to separate water from the tar flowing in the direction indicated by arrow 22 in FIG. 1. A scraper conveyor includes a top run 27. A return run 28 passes around a deflecting roller 26 to form the top run 27. The conveyor is operated within a chamber bounded below by the bottom wall 9 and longitudinally by side walls 18 and further by the front wall 7 and by an inclined wall 25 at the rear. The scraper conveyor runs in the direction indicated by arrows 29 and conveys lumps of pitch and other solids dropping toward the bottom wall 9 of the tank through the contained liquid. The materials transported by the conveyor are delivered into an ejection shaft, chute or the like 30.

Two weirs 31 with adjustable elements are disposed above the group of settlement surfaces 17 where tar-free water collects. The water spilling over the adjustable member of each weir enters into side chambers 32 which extend about all sides in the tank within the space bounded by walls 18.

A layer of water has a top surface 34 formed above the surface 33 of a tar layer in the space above the group of settlement surfaces 20. The water is discharged via weirs 35 with adjustable members into the side chambers 32. Tar is discharged from the space above the second group of settlement surfaces 20 by way of weirs 36 having adjustable members which are disposed downstream of an immersed wall 42. The discharged tar enters a tar chamber 37 and is removed therefrom by suitable means, not shown. The liquid level of water in the side chamber 32 is indicated by reference numeral 38 and the liquid level of the tar in chamber 37 is denoted by reference numeral 39. These liquid levels are generally indicative of such levels during the operation of the apparatus when processing flushing liquor from a gas main of a coke oven, for example.

The first and second groups of inclined settlement surfaces 17 and 20 according to the embodiment illustrated in the drawings, each consist of a plurality of closely spaced-apart corrugated plates with the curves thereof aligned and extending parallel to the direction of the flow of liquids passing therealong. The heavier liquids form a settlement layer in the bottoms or concave portions formed by the curved plates whereas the lighter liquids collect as a layer upon the top or raised convex portions of the plates. The tar that is separated out of the liquids by the group of settlement surfaces 17 descends along the troughs without the risk of being carried along by the liquid rising along the surfaces 17. A plurality of spaced-apart deflectors 40 extend transversely along the lower terminal ends of the plates forming the group of settlement surfaces 17. These deflectors have a height whereby they extend downwardly into the tar-collecting space located below the tar-water boundary 15. The deflectors 40 provide a shielding on both sides at the bottom of the troughs of the settlement surfaces 17.

In regard to the second group of settlement surfaces 20, the water which is separated out of the tar settles along the raised surfaces formed by the top convexities of the corrugated plates thereof. Deflector plates 41 extend transversely along both sides of the discharge opening of the troughs formed by the corrugated settlement surfaces. The deflectors 41 rise above the water level 34, thus insuring that the water which has been separated cannot remix with the tar. Heating tubes 23 are located below the group of settlement surfaces 20. The heat supplied by these tubes maintains the tar at an optimum temperature for separation. In a corresponding manner, the wall 16 is constructed from material to provide an effective heat insulation barrier.

When the apparatus is to undergo a start-up operation for the processing of flushing liquor, the weirs with their adjustable overflow members are first adjusted so that the tar-water phase boundary 15 is located at a correct elevation in the tank 4. After a provisional separation using the liquid entering the inflow basin 11, a liquid consisting mainly of water enters the group of inclined settlement surfaces 17 and a liquid consisting mainly of tar enters the second group of inclined settlement surfaces 20. Any large lumps and solids in the liquid drop toward the bottom of the tank from where they are discharged by the scraper conveyor. The liquid levels 38 and 39 in the side chambers 32 and 37, respectively, are maintained by removal of the liquids after the separation process. In view of the foregoing description and the illustration of the apparatus by the drawings, those skilled in the art can readily appreciate that the construction of the apparatus for processing flushing liquor is considerably more compact and the capital expenditure for materials is much less than in other known apparatus for similar purposes. The reduced material expenditures have been confirmed by subsequent calculation. Clearly, the dwell time of the liquids in the apparatus for the separation process is significantly shorter.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. An apparatus for processing flushing liquor from a gas main of a coke oven to obtain a watery liquid which is substantially free from tar and solids and to obtain tar which is substantially free from watery liquid and solids, said apparatus comprising:

a substantially rectangular tank including a bottom wall and pairs of opposed side walls to receive said flushing liquor and form a tar and watery liquid phase boundary within the tank;

means forming a first group of inclined settlement surfaces in said tank and having a bottom entrance way lying above said tar and watery liquid phase boundary in the tank;

a liquid receiving chamber extending within said tank along at least one side wall thereof in a manner to utilize the heat of the watery liquid in the liquid receiving chamber for maintaining a desired elevated temperature of the liquid within said tank;

first adjustable overflow means in said tank above the first group of inclined settlement surfaces to control the flow of watery liquid which is substantially free of tar and solids, from the space above the inclined settlement surfaces into said liquid receiving chamber;

means communicating with said liquid receiving chamber for discharging watery liquid therefrom;

means forming a second group of inclined settlement surfaces in said tank and having a bottom entrance way lying below said tar and watery liquid phase boundary in the tank, the bottom entrance way to said second group of inclined settlement surfaces lying below the bottom entrance way to said first group of inclined settlement surfaces;

a tar-receiving chamber including second adjustable overflow means in said tank above the second group of inclined settlement surfaces to control the flow of tar from the space above the second group of inclined settlement surfaces into the tar-receiving chamber;

an inclined wall within said tank for separating and defining a consecutive arrangement of said first group of inclined settlement surfaces from said second group of inclined settlement surfaces; and conveyor means extending into said tank below said first and second groups of settlement surfaces for discharging solids from the tank dropping out of the liquid therein.

2. The apparatus according to claim 1 wherein said conveyor means includes a scraper conveyor extending into said tank along the bottom wall thereof for conveying solids dropping out of liquids in the tank.

3. The apparatus according to claim 1 wherein said liquid receiving chamber extends along opposed side walls of said tank.

4. The apparatus according to claim 1 wherein said second adjustable overflow means includes an adjustable overflow member for discharging the watery liquid separated out of tar by said second group of inclined settlement surfaces, and a tar overflow member including an immersed wall upstream thereof for discharging tar separated by said second group of inclined settlement surfaces.

5. The apparatus according to claim 1 wherein the inclined settlement surfaces forming said first and second groups thereof are defined by trough-like convex walls extending in the liquid flow direction for collecting substances separated from the liquid.

6. The apparatus according to claim 5 wherein said convex walls forming each of said first and second groups of inclined settlement surfaces are disposed in a consecutive relationship and form parallel rows, said apparatus further comprising vertically-arranged deflectors extending from the convex walls in each of said first and second groups into adjacent areas which contain the concentrated substances separated out of the liquids due to their different specific weights.

7. The apparatus according to claim 5 wherein said convex walls forming each of said first and second groups of inclined settlement surfaces include corrugated partition plates having the corrugated surfaces thereof extending parallel to the direction of liquid flowing therealong.

8. The apparatus according to claim 1 further comprising heating means in said tank spaced below said second group of inclined settlement surfaces.

9. The apparatus according to claim 1 wherein said inclined wall within said tank defines a heat insulation barrier between said first and second groups of inclined settlement surfaces.

* * * * *